(12) United States Patent
Umigai

(10) Patent No.: US 11,014,568 B2
(45) Date of Patent: May 25, 2021

(54) SERVICE MANAGEMENT SYSTEM AND NON-TRANSITORY COMPUTER READABLE MEDIUM

(71) Applicant: TOYOTA JIDOSHA KABUSHIKI KAISHA, Toyota (JP)

(72) Inventor: Akimichi Umigai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 16/274,571

(22) Filed: Feb. 13, 2019

(65) Prior Publication Data

US 2019/0276035 A1 Sep. 12, 2019

(30) Foreign Application Priority Data

Mar. 7, 2018 (JP) .............................. JP2018-040932

(51) Int. Cl.
*B60W 40/09* (2012.01)
*G06F 16/9035* (2019.01)
*G07C 5/08* (2006.01)
*G06F 16/90* (2019.01)
*B60W 40/08* (2012.01)

(52) U.S. Cl.
CPC ......... *B60W 40/09* (2013.01); *G06F 16/9035* (2019.01); *G07C 5/0841* (2013.01); *B60W 2040/0809* (2013.01)

(58) Field of Classification Search
CPC ........... B60W 40/09; B60W 2040/0009; G06F 16/9035; G06F 21/015; G07C 5/0841; G07C 5/085
See application file for complete search history.

(56) References Cited

U.S. PATENT DOCUMENTS

| | | | |
|---|---|---|---|
| 2003/0097211 A1* | 5/2003 | Carroll | H04L 67/34 701/32.6 |
| 2012/0136743 A1* | 5/2012 | McQuade | G06Q 30/0283 705/26.3 |
| 2015/0306967 A1* | 10/2015 | Cohen | B60L 53/665 701/32.3 |
| 2016/0198002 A1* | 7/2016 | Penilla | B60L 53/665 709/228 |

FOREIGN PATENT DOCUMENTS

| | | |
|---|---|---|
| JP | H10-239077 A | 9/1998 |
| JP | 2006-004180 A | 1/2006 |

* cited by examiner

*Primary Examiner* — Tan Q Nguyen
(74) *Attorney, Agent, or Firm* — Oliff PLC

(57) ABSTRACT

A service management system manages use authority for service information, the service information including a content of a service to be provided to a user of a vehicle, the service management system includes a memory configured to store a user ID given for each user of the vehicle and service information set for each vehicle, the user ID and the service information being associated with each other, and a processor configured to unify the use authority for first service information when a plurality of pieces of service information is associated with a single user ID, the first service information being included in each piece of service information.

4 Claims, 8 Drawing Sheets

| Person-Relevant Service | Expiration Date of Navigation with Terminal |
| | Expiration Dates of Other Paid Contents |
| | ... |
| Vehicle-Relevant Service | Expiration Date of Basic Service with DCM |
| | Expiration Dates of Optional Service with DCM |
| | ... |
| The Number of Remaining Users Able to Use License ||

SERVICE MANAGEMENT SYSTEM AND NON-TRANSITORY COMPUTER READABLE MEDIUM

INCORPORATION BY REFERENCE

The disclosure of Japanese Patent Application No. 2018-040932 filed on Mar. 7, 2018 including the specification, drawings and abstract is incorporated herein by reference in its entirety.

BACKGROUND

1. Technical Field

The disclosure relates to a service management system that manages use authority for a service to be provided to a user of a vehicle, for each user, and a non-transitory computer readable medium.

2. Description of Related Art

In a system described in Japanese Patent Application Publication No. 2006-4180 (JP 2006-4180 A), a shop-side terminal is communicably connected to a vehicle and a user terminal, and communication between the user terminal and the vehicle is authenticated based on personal authentication information registered in the shop-side terminal. In the system, a person ID, a vehicle ID and a user terminal ID are associated with each other in a customer database server that is managed by the shop-side terminal. For example, using vehicle information such as a use history and repair history of the vehicle, the shop-side terminal provides a service appropriate to the vehicle, as exemplified by periodic inspection for oil change, to the user terminal corresponding to the user ID associated with the vehicle ID. Further, for example, using personal information such as a sexuality, age and non-accident history of a person, the shop-side terminal provides a service appropriate to the person, to the user terminal corresponding to the user terminal ID associated with the person ID.

SUMMARY

In the system described in JP 2006-4180 A, the vehicle ID and the person ID are associated with each other, and the service appropriate to the person is provided based on characteristics of the user corresponding to the person ID. Therefore, when a single user possesses a plurality of vehicles, it is necessary to manage use authority for the service appropriate to the person, for each vehicle, and there is still room for improvement in the management of the use authority for the service.

The disclosure provides a service management system that can manage the use authority for the service to be provided to the user of the vehicle, for each user, and a non-transitory computer readable medium.

A service management system of the disclosure is a service management system that manages use authority for service information, the service information including a content of a service to be provided to a user of a vehicle, the service management system including: a memory configured to store a user ID given for each user of the vehicle and service information set for each vehicle, the user ID and the service information being associated with each other; and a processor configured to unify the use authority for first service information when a plurality of pieces of service information is associated with a single user ID, the first service information being included in each piece of service information.

A non-transitory computer readable medium of the disclosure is a non-transitory computer readable medium storing a program causing a computer to perform a process, the computer including a memory configured to store a user ID given for each user of a vehicle and service information, the service information including a content of a service to be provided to the user of the vehicle, the user ID and the service information being associated with each other, the process including unifying use authority for first service information when a plurality of pieces of service information is associated with a single user ID, the first service information being included in each piece of service information.

With the above aspect, when a single user possesses a plurality of vehicles, the use authority for the service information corresponding to the vehicles associated with a single user ID is shared. Therefore, it is possible to manage the use authority for the service to be provided to the user of the vehicle, for each user, with a high convenience.

In the service management system, the service information may further include second service information for which the use authority is linked with the vehicle, in addition to the first service information for which the use authority is linked with the user; and the processor may be configured not to unify the use authority for the second service information, while unifying the use authority for the first service information.

With this configuration, even when a single user possesses a plurality of vehicles, the use authority is not unified for the second service information for which the use authority is linked with the vehicle. Therefore, even when a plurality of users shares a single vehicle, it is possible to prevent an unrighteous use of the service for which the use authority is linked with the vehicle.

In the service management system, the memory may be configured to store a plurality of user IDs associated with common service information; and the processor may be configured to manage the use authority for the first service information for each user ID, and manage the use authority for the second service information in common among the plurality of user IDs, when the processor manages the use authority for the common service information.

With this configuration, even when a plurality of users shares a single vehicle, the second service information set for the vehicle is applied. Therefore, it is possible to simplify the setting of the second service information, compared to when the second service information corresponding to the users is set for the vehicle.

In the service management system, the use authority for the first service information may include an expiration date of the first service information; and the processor may be configured to apply a latest expiration date of a plurality of expiration dates of the first service information, to other expiration dates of the first service information.

With this configuration, when a single user possesses a plurality of vehicles, the expiration dates of the first service information corresponding to the vehicles are unified to the latest expiration date. Therefore, the user can manage a plurality of service expiration dates, with a high convenience.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of a service management system will be described with reference to the drawings. The service management system in the embodiment is a system that manages service information (license information) when a user of a vehicle uses a service of an application using the vehicle. In this system, a portable information terminal (communication device) held by the user of the vehicle is configured to be capable of communicating with the vehicle, and a vehicle ID that is obtained by the communication with the vehicle and a user ID that is identification information of the user holding the portable information terminal are sent to a data center that manages a plurality of pieces of vehicle information. When the data center receives the vehicle ID and the user ID from the portable information terminal, the data center reads license information associated with the vehicle ID and the user ID, from a memory. Then, the data center returns the read license information to the portable information terminal as the sending source. Thereby, use in the portable information terminal of the service using the vehicle is managed.

Figure 1:
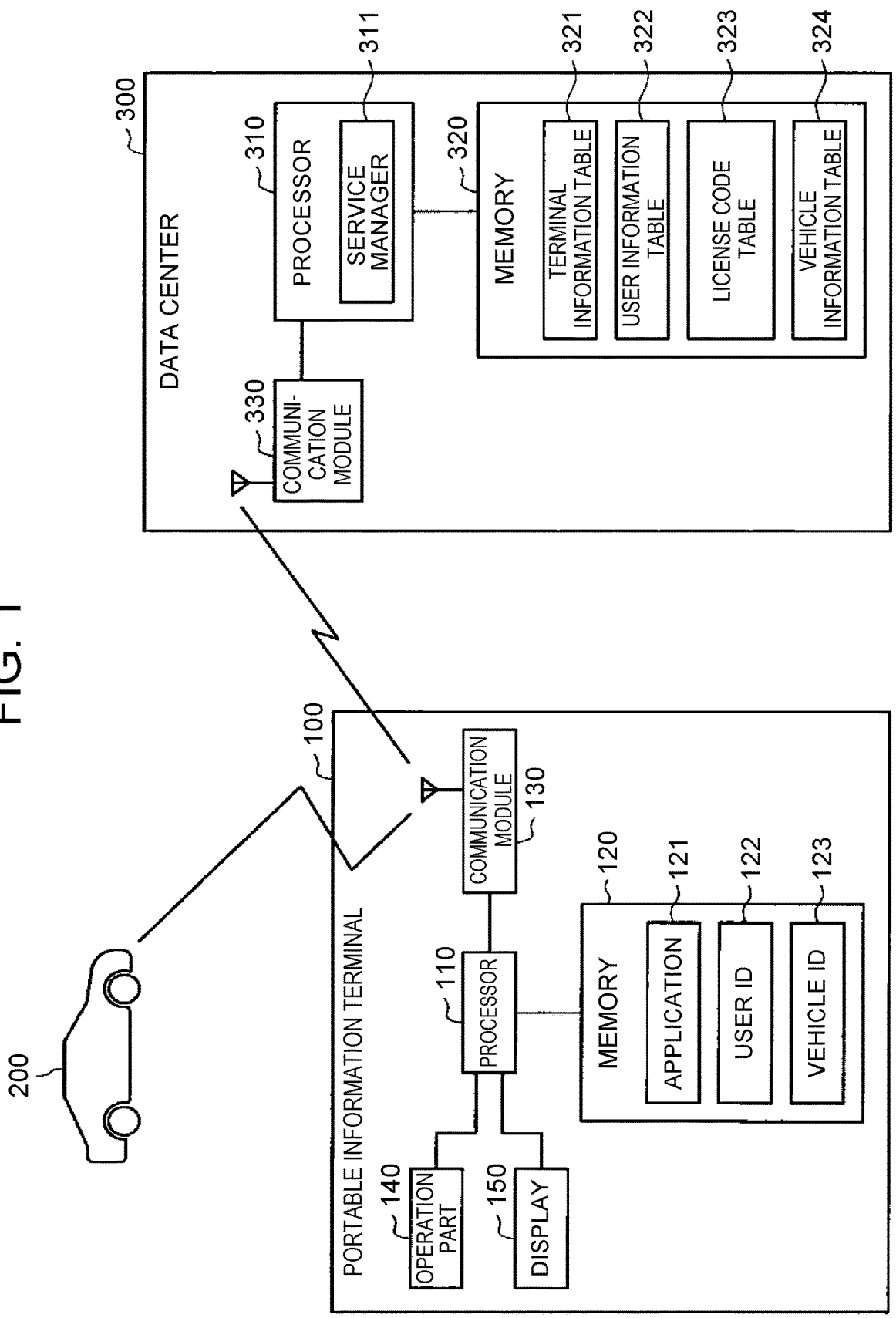
FIG. 1 is a block diagram showing a schematic configuration of an embodiment of a service management system.

Specifically, as shown in FIG. 1, the portable information terminal 100 includes a processor 110, a memory 120, a communication module 130, an operation part 140 and a display 150. The processor 110 integrally controls behavior of the portable information terminal 100, and can execute a variety of application 121 including an application using the vehicle.

The memory 120 stores a user ID 122 that is identification information of the user holding the portable information terminal 100, in addition to the variety of application 121. As the user ID 122, for example, an email address of the portable information terminal 100 is used.

The communication module 130 performs wireless communication such as Bluetooth®, with a vehicle 200, for example. By establishing wireless communication with the vehicle 200, the communication module 130 receives a vehicle ID 123 that is identification information of the vehicle 200, from the vehicle 200, and stores the vehicle ID 123 in the memory 120.

The operation part 140 and the display 150 function as user interfaces when the user operates the portable information terminal 100. The operation part 140 is a push-button operation switch, for example, and outputs an operation signal to the processor 110. When the display 150 is constituted by a touch panel display, the display 150 functions also as the operation part 140.

Meanwhile, a data center 300 includes a processor 310, a memory 320 and a communication module 330. The processor 310 integrally controls behavior of the data center 300, and functions as a service manager 311 that manages use in the portable information terminal 100 of the application 121 using the vehicle in response to a request from the portable information terminal 100.

In the memory 320, a variety of data to be used when the service manager 311 manages the use of the application 121 is stored. Examples of the variety of data include a terminal information table 321, a user information table 322, a license code table 323 and a vehicle information table 324.

When the service manager 311 receives the user ID 122 and the vehicle ID 123 from the portable information terminal 100 through the communication module 130, the service manager 311 refers to the tables 321 to 324 stored in the memory 320, and extracts license information when the user uses the application 121 using the vehicle 200, based on the user ID 122 and the vehicle ID 123. The service manager 311 sends the extracted license information from the communication module 330 to the portable information terminal 100 as the sending source of the user ID 122 and the vehicle ID 123. Thereby, the use of the application 121 in the portable information terminal 100 is managed based on the license information.

Figure 2:
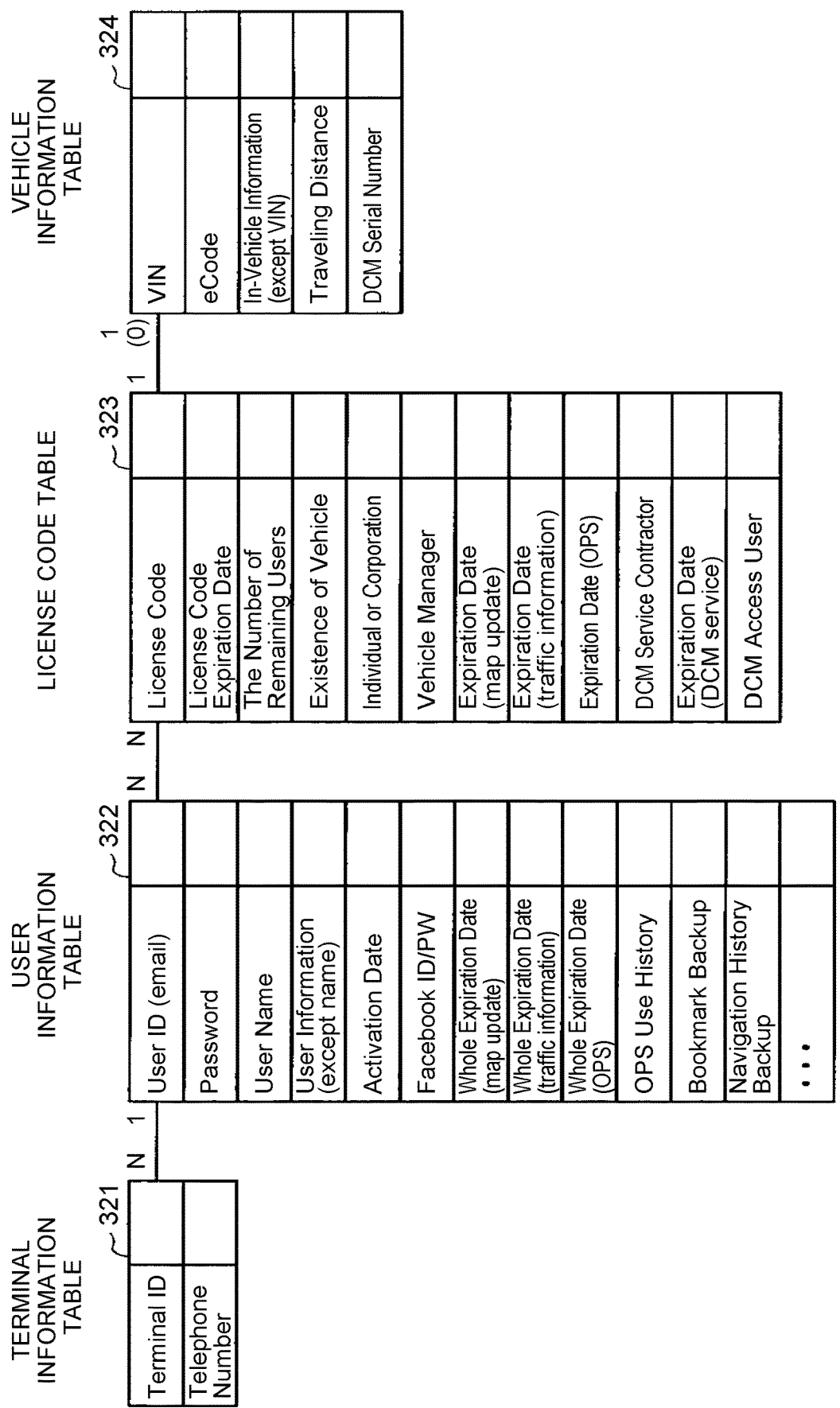
FIG. 2 is a schematic diagram showing exemplary data contents stored in data tables.

More specifically, as shown in FIG. 2, in the terminal information table 321, a telephone number of the portable information terminal 100, and the like are stored, using the terminal ID that is individual information of the portable information terminal 100, as a key.

In the user information table 322, a password to be used for authentication of the user ID 122, user information about the user such as a user name, user personal information including service use history information, an expiration date of a navigation service based on the user ID 122, and the like are stored, using the user ID 122 received from the portable information terminal 100 by the data center 300, as a key.

In the license code table 323, an expiration date of a license code that is an identification number of the license information, license restriction information such as the number of users able to use the license and expiration dates of a navigation service based on the license code and a service using a data communication module (DCM) mounted on the vehicle, license contractor information, manager information about the vehicle that is a license object, and the like are stored, using the license code as a key.

In the vehicle information table 324, traveling history information such as a traveling distance of the vehicle, in-vehicle device information such as a serial number of the DCM, and the like are stored, using a vehicle identification number (VIN) that is an identification number of the vehicle, as a key.

Further, the terminal information table 321 and the user information table 322 are associated with each other, based on the terminal ID and the user ID 122 as the respective keys. On this occasion, a plurality of terminal IDs can be associated with a single user ID. That is, when the user holds a plurality of portable information terminals 100, a plurality of terminal information tables 321 different corresponding to the plurality of portable information terminals 100 is associated with a common user information table 322.

Further, the user information table 322 and the license code table 323 are associated with each other, based on the user ID 122 and the license code as the respective keys. On this occasion, a plurality of license codes can also be associated with a single user ID. That is, when the user has licenses for a plurality of vehicles, the license code table 323 different for each vehicle is associated with a common user information table 322. Further, a plurality of user IDs 122 can also be associated with a single license code. That is, when a license for an identical vehicle is shared by a plurality of users, the user information table 322 different for each user is associated with a common license code table 323.

Further, the license code table 323 and the vehicle information table 324 are associated with each other, based on the license code and VIN as the respective keys. On this occasion, a single VIN can be associated with a single license code. That is, the license information to be applied to an identical vehicle is common information, and the license code table 323 and the vehicle information table 324 have a one-to-one correspondence relation.

Figure 3:
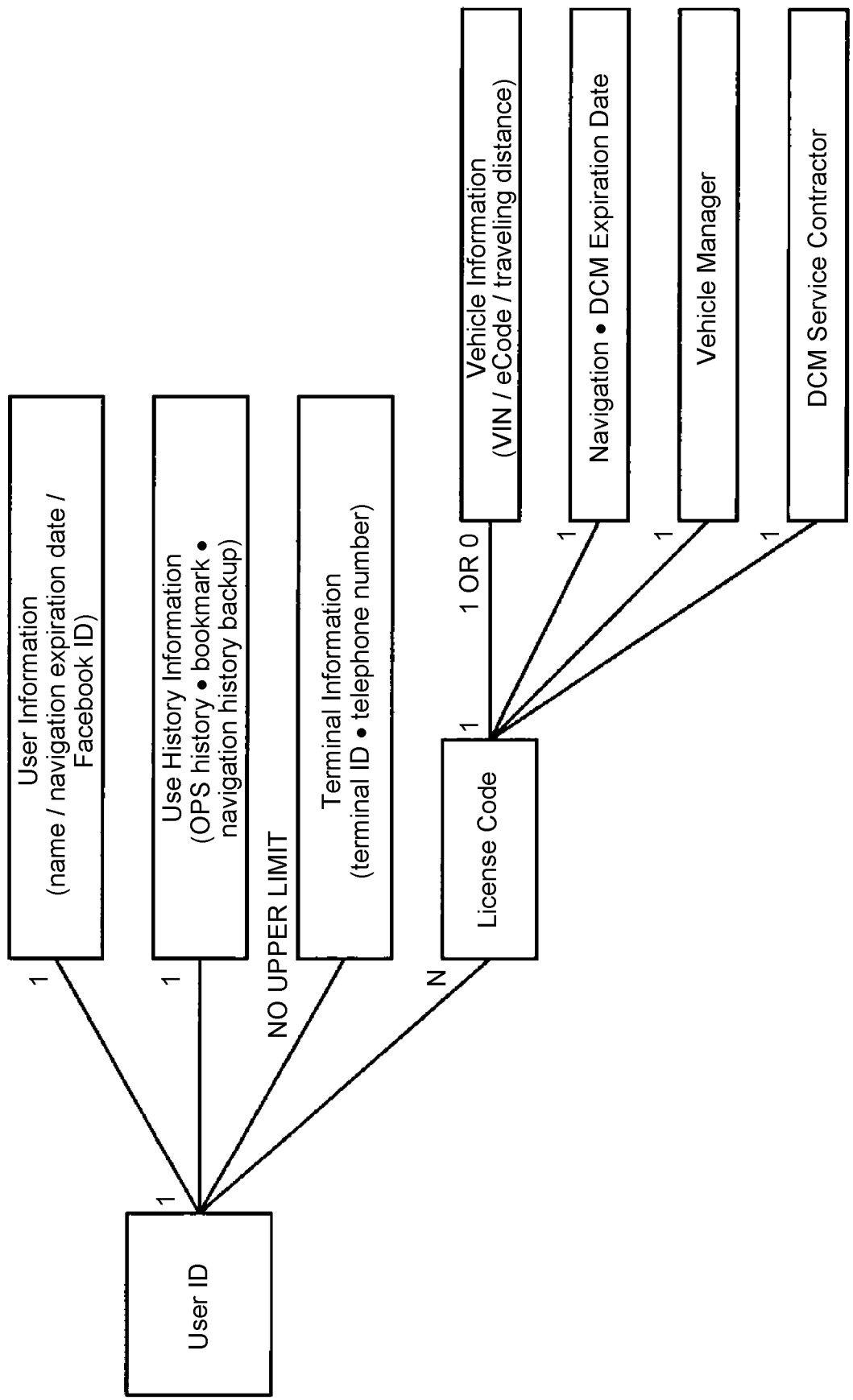
FIG. 3 is a schematic diagram showing an exemplary association of a variety of information with a user ID.

Accordingly, as shown in FIG. 3, the user information about the user, the use history information about the service, the terminal information about the portable information terminal 100, and the license code are associated with a single user ID. On this occasion, the user ID and the user information about the user have a one-to-one correspondence relation, and the user ID and the use history information about the service have a one-to-one correspondence relation. In contrast, a plurality of pieces of terminal information can be associated with a single user ID, and there is no upper limit on the number of pieces of terminal information as the object. Further, a plurality of license codes can be associated to a single user ID, but there is an upper limit on the number of license codes as the object (for example, the upper limit is five).

Further, the vehicle information, the expiration dates of the navigation services and the DCM, the manager information about the vehicle as the object of the license, and the contractor information about the service using the DCM are associated with a single license code. On this occasion, each piece of the above-described information has a one-to-one correspondence relation with the single license code.

Figures 4, 5:
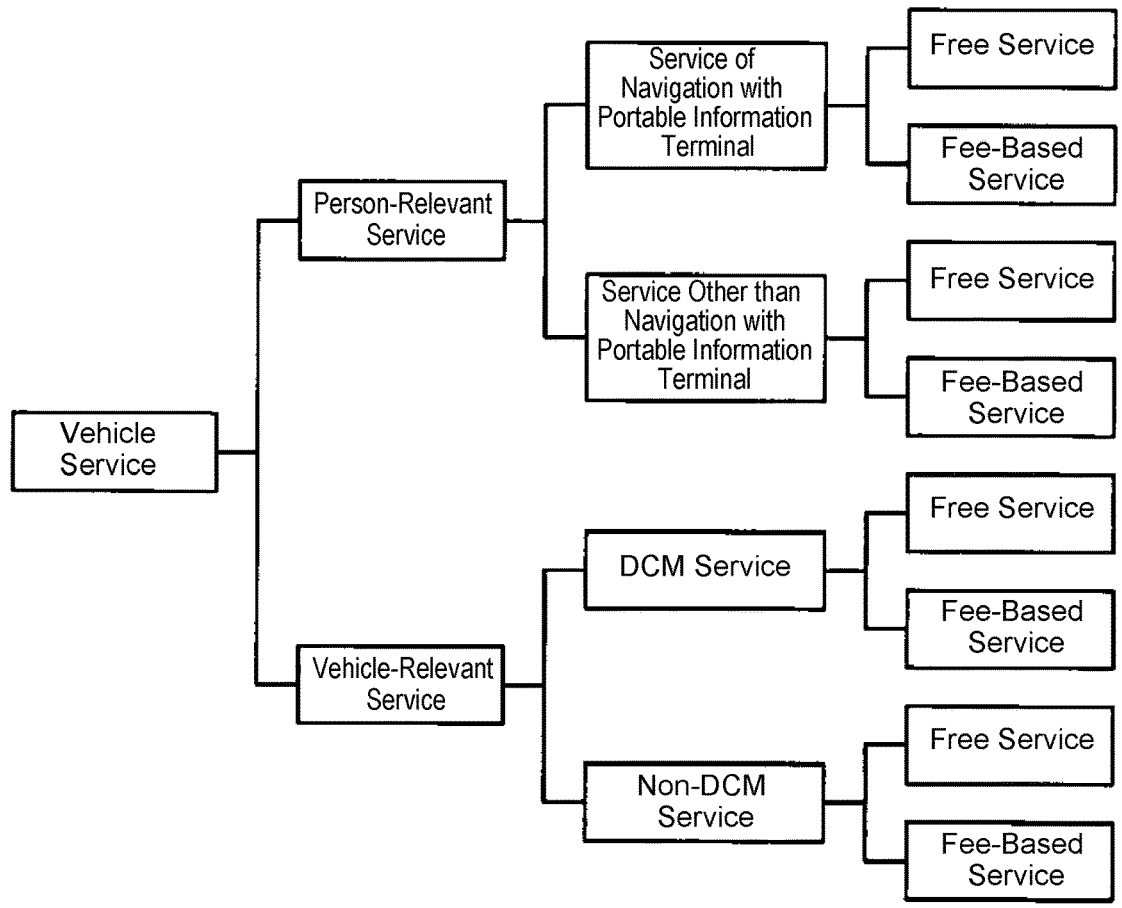
FIG. 4 is a schematic diagram showing an exemplary classification of services to be provided to a user of a vehicle.
FIG. 5 is a schematic diagram showing an exemplary data content of license information.

As shown in FIG. 4, the service to be provided to the user of the vehicle is classified into a person-relevant service that is relevant to the user and a vehicle-relevant service that is relevant to the vehicle. The person-relevant service is a service for which the use authority is linked with the user, and is classified into a navigation service using the portable information terminal 100 held by the user and other services. The vehicle-relevant service is a service for which the use authority is linked with the vehicle, and is classified into a service using the DCM mounted on the vehicle and a service not using the DCM. Each of the classified services includes a fee-based service and a free service.

As shown in FIG. 5, in addition to the number of users able to use the license, as described above, the license information includes license information about the person-relevant service and license information about the vehicle-relevant service. In an example shown in FIG. 5, the license information about the person-relevant service includes the expiration date of the navigation service using the portable information terminal 100 and the expiration dates of other paid contents. In this example, the license information about the vehicle-relevant service includes the expiration date of a basic service using the DCM and the expiration dates of optional service using the DCM.

Figure 6A:
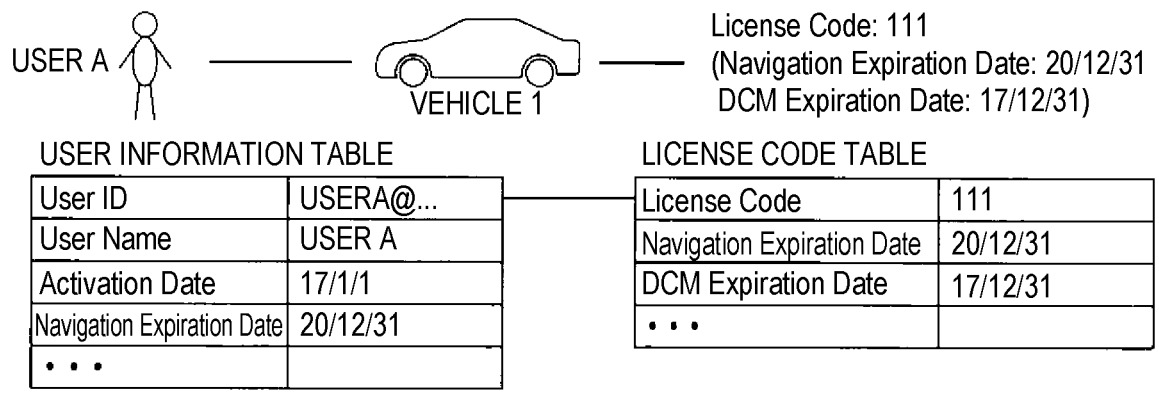
FIG. 6A is a schematic diagram showing an exemplary association of a variety of information with the user ID.

Next, a manner of setting of the license information to the application when the user holding the portable information terminal 100 uses the vehicle 200 will be described with specific examples. In an example shown in FIG. 6A, the number of object users is one ("USER A"), and the number of object vehicles is one ("VEHICLE 1"). In this example, a license code ("111") corresponding to "VEHICLE 1" is associated with the user ID ("USERA@ . . . ") corresponding to "USER A". The navigation expiration date ("20/12/31") and DCM expiration date ("17/12/31") for "VEHICLE 1" are associated with the license code ("111"). In this case, the navigation expiration date for "USER A" is set to "20/12/31". The DCM expiration date for "USER A" is set to "17/12/31".

Figure 6B:
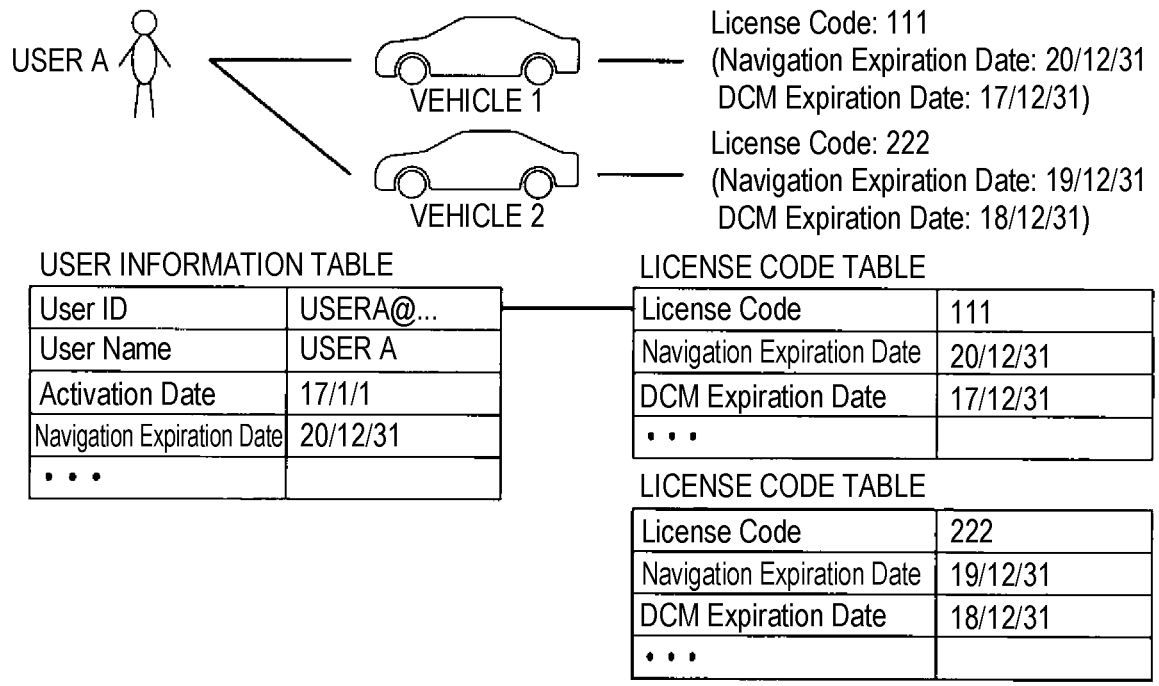
FIG. 6B is a schematic diagram showing an exemplary association of a variety of information with the user ID.

In an example shown in FIG. 6B, the number of object users is one ("USER A"), and the number of object vehicles is two ("VEHICLE 1", "VEHICLE 2"). In this example, the license code ("111") corresponding to "VEHICLE 1" and a license code ("222") corresponding to "VEHICLE 2" are associated with the user ID ("USERA@ . . . ") corresponding to "USER A". The navigation expiration date ("20/12/31") and DCM expiration date ("17/12/31") for "VEHICLE 1" are associated with the license code ("111"). The navigation expiration date ("19/12/31") and DCM expiration date ("18/12/31") for "VEHICLE 2" are associated with the license code ("222"). In this case, the navigation expiration date for "USER A" is set to the latest navigation expiration date ("20/12/31") of the navigation expiration date ("20/12/31") for "VEHICLE 1" and the navigation expiration date ("19/12/31") for "VEHICLE 2". As the DCM expiration date for "USER A", the DCM expiration date ("17/12/31") is set for "VEHICLE 1", and the DCM expiration date ("18/12/31") is set for "VEHICLE 2". That is, the navigation expiration date for which the use authority is linked with the user is unified, but the DCM expiration date for which the use authority is linked with the vehicle is not unified.

Figure 6C:
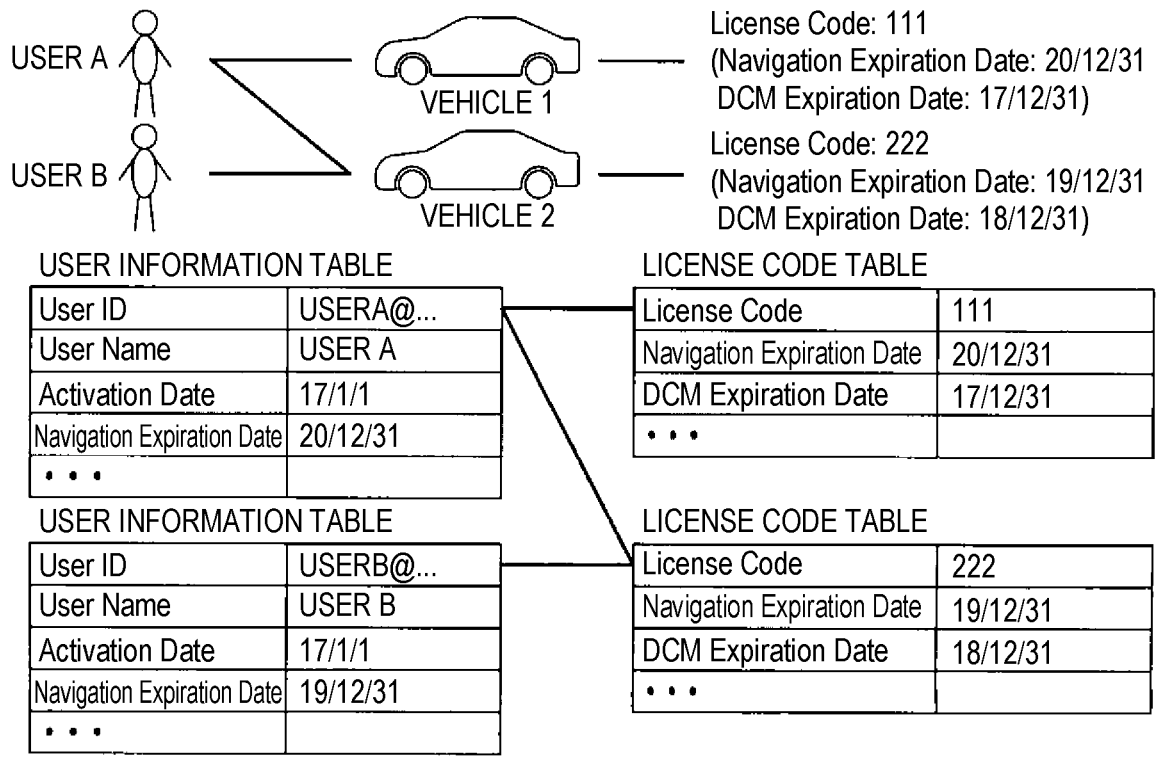
FIG. 6C is a schematic diagram showing an exemplary association of a variety of information with the user ID.

In an example shown in FIG. 6C, the number of object users is two ("USER A", "USER B"), and the number of object vehicles is two ("VEHICLE 1", "VEHICLE 2"). In this example, the license code ("111") corresponding to "VEHICLE 1" and a license code ("222") corresponding to "VEHICLE 2" are associated with the user ID ("USERA@ . . . ") corresponding to "USER A". The license code ("222") corresponding to "VEHICLE 2" is associated with the user ID ("USERB@ . . . ") corresponding to "USER B". The navigation expiration date ("20/12/31") and DCM expiration date ("17/12/31") for "VEHICLE 1" are associated with the license code ("111"). The navigation expiration date ("19/12/31") and DCM expiration date ("18/12/31") for "VEHICLE 2" are associated with the license code ("222"). In this case, the navigation expiration date for "USER A" is set to the latest navigation expiration date ("20/12/31") of the navigation expiration date ("20/12/31") for "VEHICLE 1" and the navigation expiration date ("19/12/31") for "VEHICLE 2". The navigation expiration date for "USER B" is set to the navigation expiration date ("19/12/31") for "VEHICLE 2". That is, when a plurality of user IDs is associated with a common license code, the navigation expiration date for which the use authority is linked with the user is managed for each user ID. As the DCM expiration date for "USER A", the DCM expiration date ("17/12/31") is set for "VEHICLE 1", and the DCM expiration date ("18/12/31") is set for "VEHICLE 2". On the other hand, as the DCM expiration date for "USER B", the DCM expiration date ("18/12/31") for "VEHICLE 2" is set. That is, when a plurality of user IDs is associated with a common license code, the DCM expiration date for which the use authority is linked with the vehicle is managed in common among the plurality of user IDs.

Figure 7:
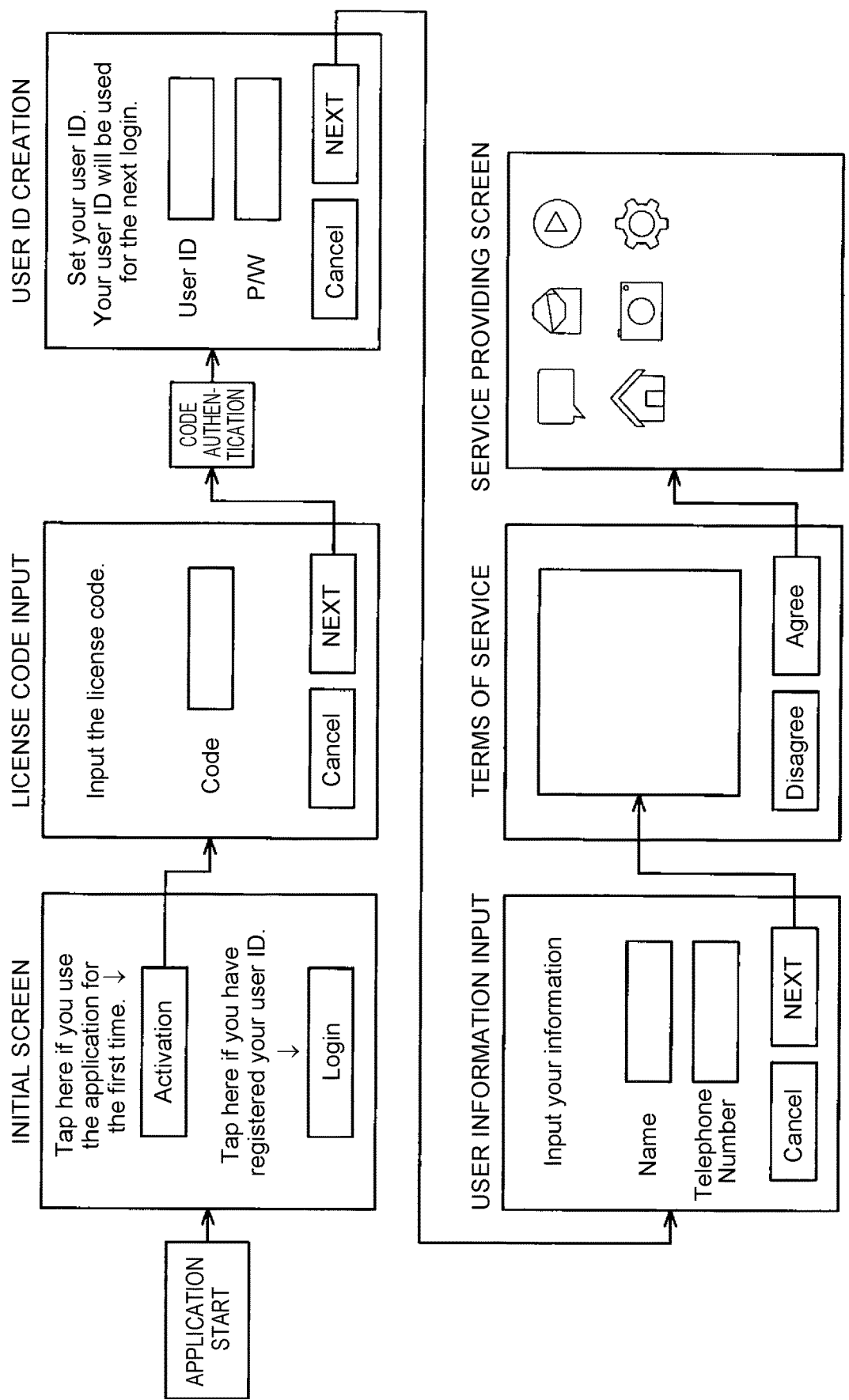
FIG. 7 is a schematic diagram showing a process flow in an initial registration of a variety of information associated with the license information.

Next, a process flow in an initial registration of a variety of information associated with the license information will be described. As shown in FIG. 7, in the initial registration of the variety of information, first, the application 121 is started by operating the operation part 140 of the portable information terminal 100.

Then, an initial screen of the application 121 is displayed on the display 150 of the portable information terminal 100. When the initial registration of the user ID is selected on the initial screen, an input screen for the license code is displayed on the display 150.

Subsequently, when the license code is input through the operation part 140, a code authentication of the license code is performed. The code authentication is performed by whether the input license code coincides with one of the license codes registered in the license code table 323. Then, when the code authentication succeeds, a creation screen for the user ID is displayed on the display 150.

When the user ID and the password are input through the operation part 140 on the creation screen for the user ID, an input screen for the user information is displayed on the display 150. When the user name and the telephone number of the portable information terminal 100 are input through the operation part 140 on the input screen for the user information, a screen for terms of service about the application 121 is displayed on the display 150.

When an operation for agreement is input through the operation part 140 on the screen for terms of service, a providing screen for the service using the application 121 is displayed on the display 150. In this case, on the providing screen, services that the license information permits to be executed are displayed, but services that the license information prohibits from being executed are not displayed. That is, the use of the service using the application 121 is managed based on the license information.

Figure 8:
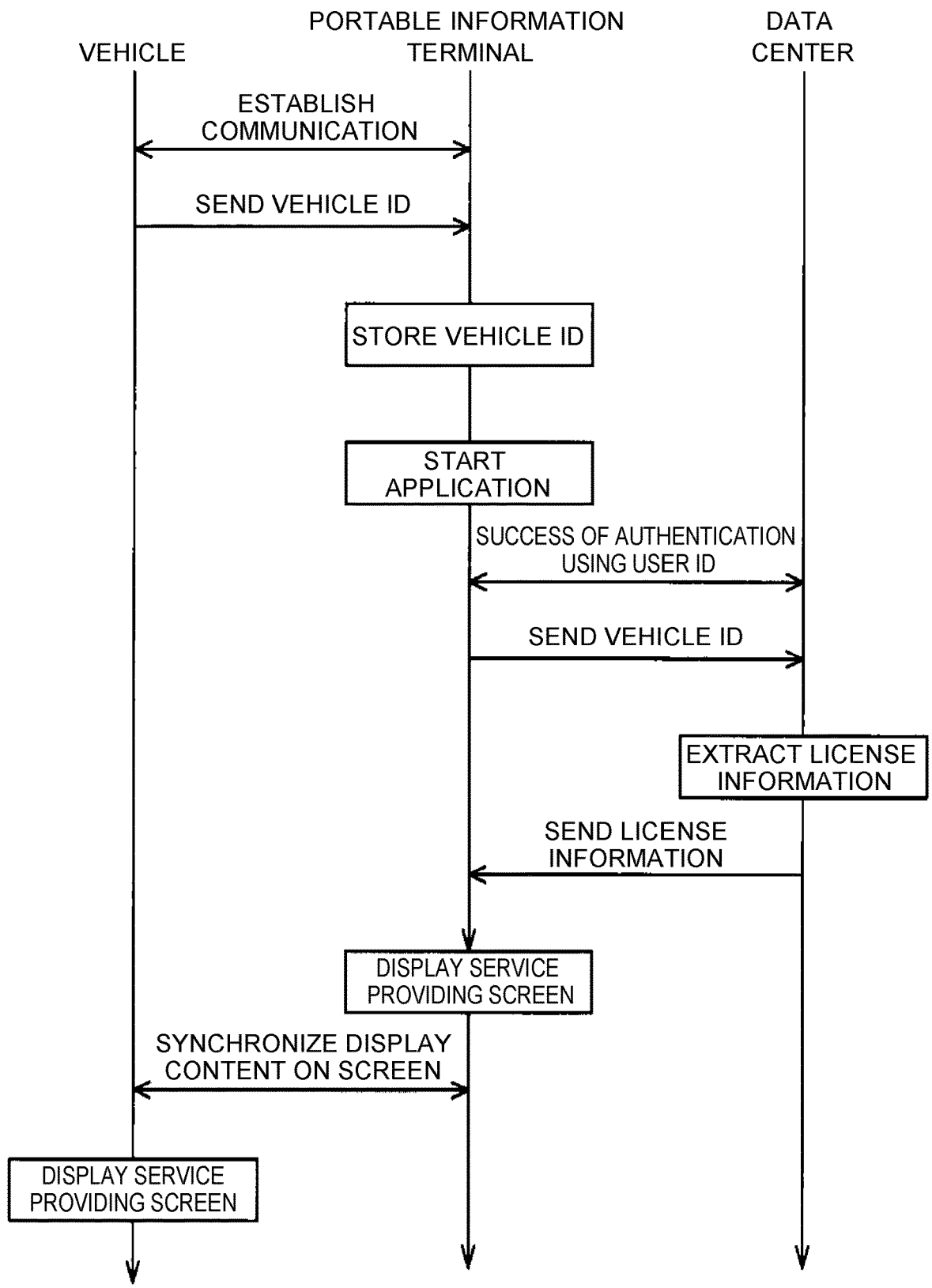
FIG. 8 is a sequence chart showing a service management process that is executed by the service management system in the embodiment.

Next, a service management process that is executed by the service management system in the embodiment will be described. As shown in FIG. 8, in the embodiment, as a premise, when the communication between the vehicle 200 and the portable information terminal 100 is established by wireless communication, the vehicle ID 123 of the vehicle 200 is set from the vehicle 200 to the portable information terminal 100. At this time, the portable information terminal 100 stores the vehicle ID 123 received from the vehicle 200, in the memory 120.

When the service is provided to the user of the vehicle, the user, first, starts the application 121 mounted on the portable information terminal 100 held by the user. At this time, in connection with the start of the application 121, the input screen for the user ID 122 is displayed on the display 150 of the portable information terminal 100.

Then, when the user ID 122 is input through the operation part 140 of the portable information terminal 100, the input user ID 122 is sent from the portable information terminal 100 to the data center 300. At this time, the data center 300 performs the authentication process for the user ID 122 input from the portable information terminal 100. When the authentication process by the data center 300 succeeds, the portable information terminal 100 reads the vehicle ID 123 stored in the memory 120, and sends the vehicle ID 123 to the data center 300.

Then, based on the user ID 122 and vehicle ID 123 input from the portable information terminal 100, the data center 300 refers to the user information table 322, the license code table 323 and the vehicle information table 324, and extracts the license information corresponding to the combination of the user ID 122 and the vehicle ID 123, from the license code table 323.

More specifically, the data center 300 refers to the user information table 322 and the license code table 323, and extracts a single or a plurality of license codes associated with the user ID 122. When only a single license code is associated with the user ID 122, the data center 300 extracts the license information corresponding to the combination of the user ID 122 and the vehicle ID 123, from the license code table 323, based on the license code. On the other hand, when a plurality of license codes is associated with the user ID 122, the data center 300 selects the license code associated with the vehicle ID 123, from the plurality of license codes. Based on the selected license code, the data center 300 extracts the license information corresponding to the combination of the user ID 122 and the vehicle ID 123, from the license code table 323. Then, the data center 300 sends the license information extracted from the license code table 323, to the portable information terminal 100.

Thereafter, based on the license information received from the data center 300, the portable information terminal 100 displays the providing screen for the service of the application 121 in which the use is restricted, on the display 150. At this time, the portable information terminal 100 performs the synchronization of the display information with an in-vehicle device mounted on the vehicle 200. Therefore, on the in-vehicle device mounted on the vehicle 200, the providing screen for the service of the application 121 in which the use is restricted based on the above-described license information is displayed, similarly to the portable information terminal 100.

As described above, with the above embodiment, it is possible to obtain the following effects. When a single user possesses a plurality of vehicles 200, the use authority for the license code corresponding to the vehicles 200 associated with a single user ID is shared. Therefore, it is possible to manage the use authority for the service to be provided to the user of the vehicle 200, for each user, with a high convenience.

When a single user possesses a plurality of vehicles 200, the DCM expiration date for which the use authority is linked with the vehicle 200 is excluded from the object for which the use authority for the license code is shared. Therefore, even when a plurality of users shares a single vehicle 200, it is possible to prevent an unrighteous use of the service that uses the DCM and for which the use authority is linked with the vehicle 200.

When a plurality of user IDs is associated with a common license code and the use authority for the license code is managed, the navigation expiration date for which the use authority is linked with the user is managed for each user ID, and the DCM expiration date for which the use authority is linked with the vehicle is managed in common among the plurality of user IDs. Thereby, even when a plurality of users shares a single vehicle 200, the DCM expiration date set for the vehicle 200 is applied. Therefore, it is possible to simplify the setting of the DCM expiration date, compared to when the DCM expiration date corresponding to the users is set for the vehicle 200.

When a single user possesses a plurality of vehicles 200, the expiration dates of the license codes corresponding to the vehicles 200 are unified to the latest expiration date. Therefore, the user can manage a plurality of service expiration dates, with a high convenience.

The above embodiment may be modified to be carried out as follows. In the above embodiment, when a plurality of users shares a single vehicle 200, the DCM expiration date set for the vehicle 200 is applied. Instead, when a plurality of users shares a single vehicle 200, the DCM expiration date for each user may be set for the vehicle 200.

In the above embodiment, when a single user possesses a plurality of vehicles 200, the DCM expiration date for which the use authority is linked with the vehicle 200 is excluded from the object for which the use authority for the license code is shared. However, the DCM expiration date for which the use authority is linked with the vehicle 200 may be applied as the object for which the use authority for the license code is shared.

In the above embodiment, as the use authority for the service, the use term for the service is specified. However, the use authority for the service is not limited to the use term for the service, and for example, may be the number of times of use of the service, a period of time of use of the service, or an area of use of the service.

In the above embodiment, the data center 300 refers to the user information table 322 and the license code table 323, and extracts the license code associated with the user ID. Then, when a plurality of license codes is associated with the user ID, the data center 300 selects the license code associated with the vehicle ID 123, from the plurality of license codes. Instead, the data center 300 may refer to the vehicle information table 324, and may extract the license code associated with the vehicle ID 123. Then, the data center 300 may read the license information corresponding to the extracted license code, with the condition that the extracted license code is associated with the user ID 122.

In the above embodiment, the portable information terminal 100 to communicate with the vehicle 200 requests the license information to the data center 300. However, when an in-vehicle device such as a navigation device mounted on the vehicle 200 has a communication function, the in-vehicle device may directly request the license information to the data center 300.

What is claimed is:

1. A service management system that manages use authority for service information, the service information including a content of a service to be provided to a user of a vehicle, the service management system comprising:
   a memory configured to store a user ID given for each user of the vehicle and service information set for each vehicle, the user ID and the service information being associated with each other; and
   a processor configured to unify the use authority for first service information when a plurality of pieces of service information is associated with a single user ID, the first service information being included in each piece of service information, wherein:
   the service information further includes second service information for which the use authority is linked with the vehicle, in addition to the first service information for which the use authority is linked with the user; and
   the processor is configured not to unify the use authority for the second service information, while unifying the use authority for the first service information.

2. The service management system according to claim 1, wherein:
   the memory is configured to store a plurality of user IDs associated with common service information; and
   the processor is configured to manage the use authority for the first service information for each user ID, and manage the use authority for the second service information in common among the plurality of user IDs, when the processor manages the use authority for the common service information.

3. The service management system according to claim 1, wherein:
   the use authority for the first service information includes an expiration date of the first service information; and
   the processor is configured to apply a latest expiration date of a plurality of expiration dates of the first service information, to other expiration dates of the first service information.

4. A non-transitory computer readable medium storing a program causing a computer to perform a process, the computer including a memory configured to store a user ID given for each user of a vehicle and service information, the service information including a content of a service to be provided to the user of the vehicle, the user ID and the service information being associated with each other,
   the process comprising unifying use authority for first service information when a plurality of pieces of service information is associated with a single user ID, the first service information being included in each piece of service information, wherein:
   the service information further includes second service information for which the use authority is linked with the vehicle, in addition to the first service information for which the use authority is linked with the user; and
   the process is configured not to unify the use authority for the second service information, while unifying the use authority for the first service information.

* * * * *